C. L. SELBY.
WATER METER.
APPLICATION FILED FEB. 23, 1917.

1,238,203.

Patented Aug. 28, 1917.

INVENTOR.
C. L. Selby

UNITED STATES PATENT OFFICE.

CHARLES L. SELBY, OF ST. MARYS, OHIO.

WATER-METER.

1,238,203.  Specification of Letters Patent.  Patented Aug. 28, 1917.

Application filed February 23, 1917. Serial No. 150,385.

*To all whom it may concern:*

Be it known that I, CHARLES L. SELBY, citizen of the United States, residing at St. Marys, in the county of Auglaize and State of Ohio, have invented certain new and useful Improvements in Water-Meters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1:
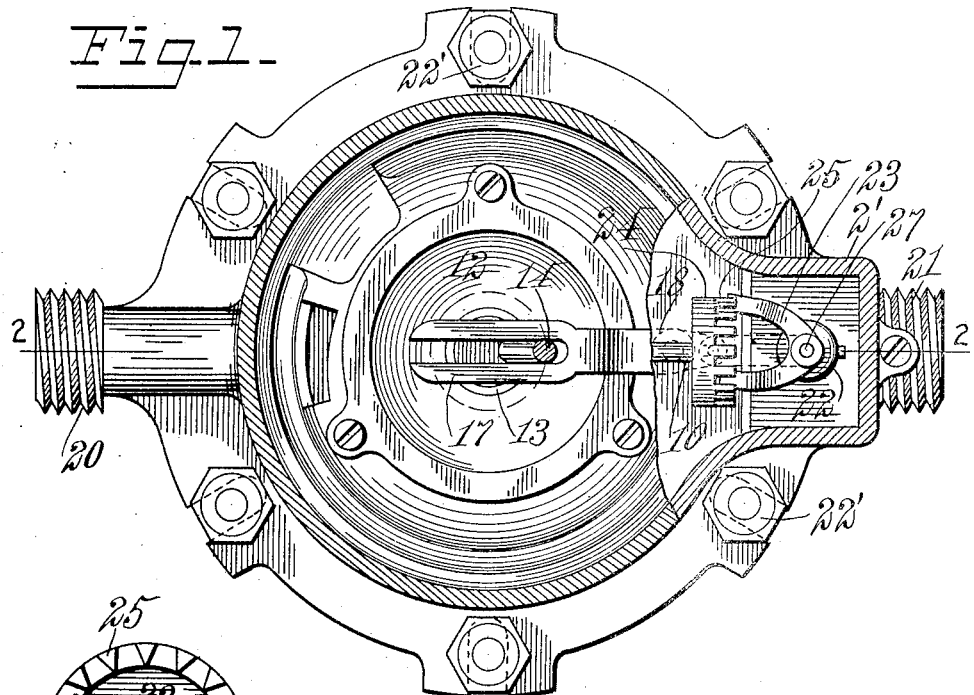
Figure 3:
Figure 2:
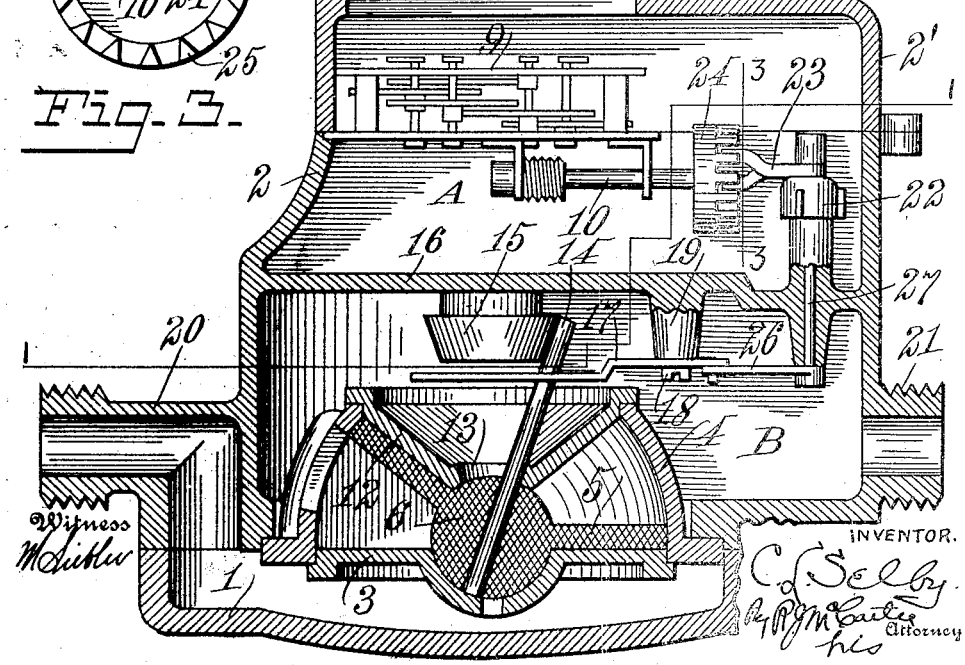

This invention relates to improvements in water meters. The object of the invention is to provide a water meter which is operated in a common manner by the water passing through the meter through the employment of mechanisms by which a minimum of resistance is offered and by which I am enabled to reduce the comparative size of the meter as a whole. In accomplishing the purposes of my improved water meter, I provide a maximum of leverage between the piston and the register whereby the loss due to friction of the stuffing box is overcome. In the accompanying drawings Figure 1 is a horizontal sectional view of the meter on the line 1—1 of Fig. 2; Fig. 2 is a vertical sectional view on the line 2—2 of Fig. 1; Fig. 3 is a sectional view of the escapement on the line 3—3 of Fig. 2. In the detailed description of the invention, similar reference characters indicate corresponding parts in the drawings.

The casing consists of a bottom portion 1 having inlet and discharge nipples 20 and 21 respectively, and a top portion 2 which is attached to the bottom portion 1 by a suitable number of cap screws 22'. The top portion 2 has an offset 2' on one side to provide the necessary space for the transmission devices to be presently described. A door 8 hinged at 8' incloses an opening in the top of the casing through which a convenient form of register dial 9 is viewable. This dial is operated from a worm shaft 10 in a well known manner, and the present improvements relate to the mechanism for actuating this worm shaft 10 from the piston. The piston consists of a disk 5 and ball 6, which parts are integral and have a rolling movement under the force of the water passing through the meter. The ball portion of the piston seats within a concaved recess in the bottom 3 of the piston housing 4. The parts 3 and 4 constitute a casing which is mounted within the lower portion of the meter casing. The top of the piston housing is also closed by a tapered cover 12 which has an opening 13 in the portion thereof that lies above the body 6 of the piston. The body 6 has mounted in it a stem 14 which projects through the opening 13 and extends above the housing of the piston where it engages a guide, consisting of a tapered head 15 which projects down from a horizontal division wall 16 that separates the upper portion 2 of the casing into two compartments A and B. The stem 14 has an orbital movement under the rocking motion imparted to the piston by the water passing through the meter. The upper compartment is to accommodate the registering devices and the transmission devices therefor, and the lower portion B provides the water passage through the meter and space in which the piston housing is placed. The head 15, as before stated, has a tapered surface and serves to guide the stem 14 as it is moved therearound by the rolling action of the piston. 17 designates a forked arm or lever which receives the upper end of the stem 14. The length of the forked end of said lever 17 is such that the stem 14 is confined within said fork when moving around the tapered guide 15. The lever 17 is of suitable form and has its fulcrum at 18 on a boss 19 which projects down from the division wall 16. 27 designates an upright shaft mounted in a stuffing box 22 formed on the division wall 16 and projecting upwardly and downwardly from the plane of said division wall. Fixed to the upper end of this shaft 27 is the forked member 23 which constitutes a feature of the escapement device, the other feature of which is a crown wheel 24 which is fixed to the worm shaft 10 through which the meter dial 9 is operated. The crown teeth of the gear 24 are tapered outwardly, as shown in Fig. 3 where 25 indicates the teeth proper. The prongs of the escapement member 23 have flat sides that move in parallel relation with the tapered sides of the teeth 25, and as the shaft 27 is oscillated from the lever 17, the operation of the worm shaft 10 is similar to that of an escapement movement. The lower end of the shaft 27 has fixed to it an oscillating crank 26 an end of which is flexibly connected to the adjacent end of the lever 17. It will therefore be seen that the movement transmitted to the lever 17 from the piston pin 14 will be imparted to the shaft 27. The movement imparted from the piston pin 14 to the shaft 27 is instrumental in moving the prongs of the escapement member 23 alternately in and out of mesh with the opposite teeth of the escapement member 24. The transmission lever 17 affords ample leverage for accurately moving the dial devices through the escapement members, and overcomes the friction of the stuffing box 22 to a desirable extent. This manner of transmitting the movement of the water actuated piston to the registering dial also enables the size of the meter as a whole to be confined within desirable limits.

Having described my invention, I claim:

1. In a water meter, the combination of an outer casing, an inner casing providing a water passage, a disk piston mounted in said water passage, a movement transmission stem projected from said piston, a guide for the upper end of said stem, a lever actuated by said stem, a shaft actuated from said lever, and escapement devices actuated from said shaft and through which the meter dial is operated to indicate the flow of water through the meter.

2. In a water meter, the combination of a casing providing a water passage, a disk piston mounted in said passage, a transmission stem secured to said piston and having an orbital movement, a lever actuated by said stem, an upright shaft, a link connecting said upright shaft with said lever, and escapement devices actuated from said shaft and transmitting movement to the meter indicating dial, substantially as specified.

3. In a water meter, the combination of a casing providing a water passage, a disk piston mounted in said passage and having a stem projected therefrom, a bifurcated lever actuated by said stem, an upright shaft, an arm pivotally connected to said lever and adapted to actuate said shaft, escapement devices actuated by said shaft, and a worm shaft actuated by said escapement devices and through which the meter indicator or register is operated from the movement of the piston.

4. In a water meter, the combination of a casing providing a water passage, a disk piston mounted in said casing, a stem projected from said piston, a tapered guide engaging the upper end of said stem and between which and the top of said casing the movement of said stem is confined, a bifurcated lever actuated by said stem, an upright shaft, a connection between said upright shaft and said lever whereby the shaft is operated from the lever, escapement devices comprising a forked member fixed to said shaft, a crown wheel actuated by said escapement, and a worm shaft actuated from said crown wheel and through which movement is imparted to the meter register, substantially as specified.

In testimony whereof I affix my signature.

CHARLES L. SELBY.